Figures 1, 2, 3:
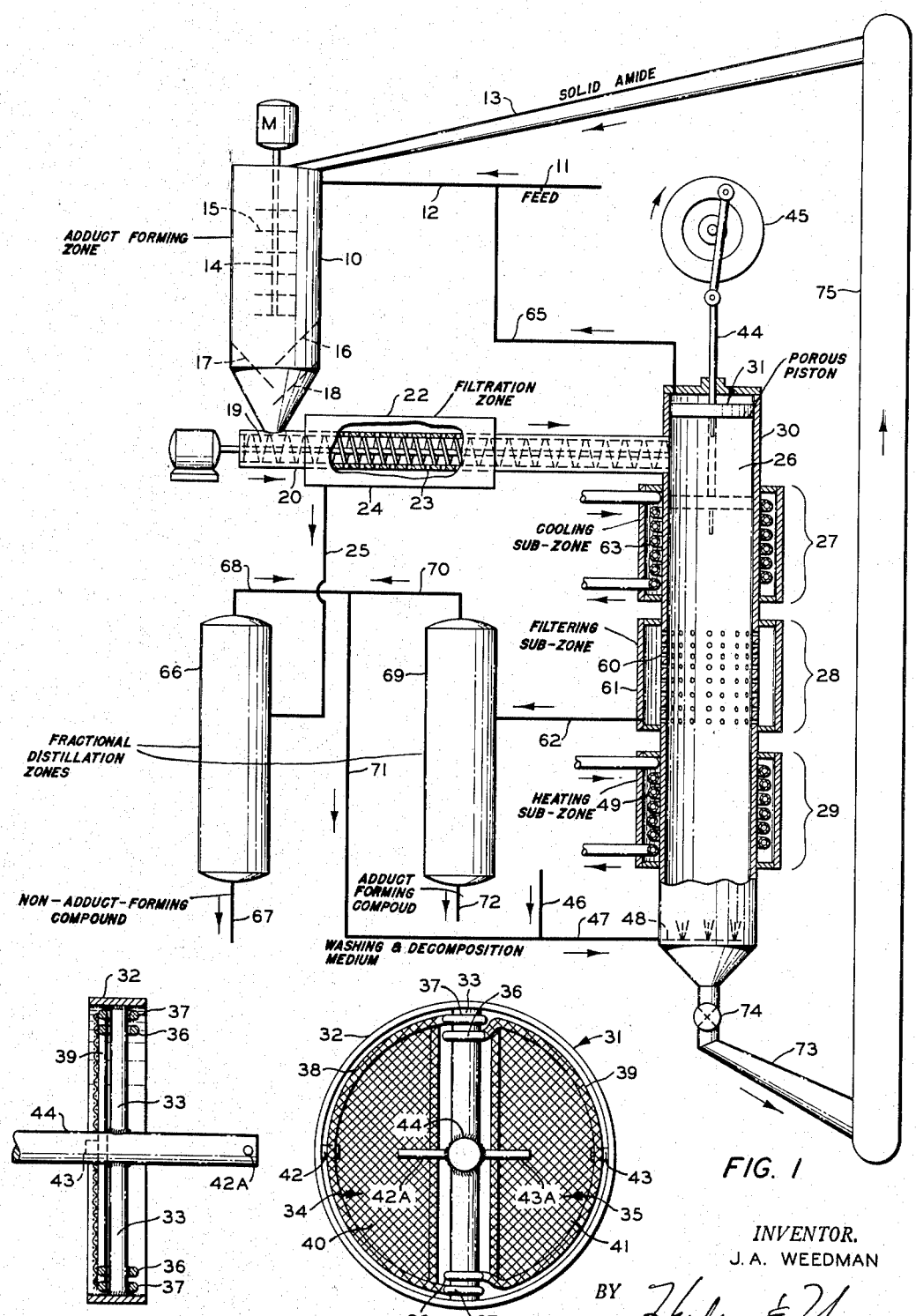

Jan. 17, 1956  J. A. WEEDMAN  2,731,456
SEPARATION PROCESS AND APPARATUS
Filed Oct. 23, 1950

INVENTOR.
J. A. WEEDMAN
BY Hudson & Young
ATTORNEYS

United States Patent Office 2,731,456
Patented Jan. 17, 1956

2,731,456
SEPARATION PROCESS AND APPARATUS

John A. Weedman, Bartlesville, Okla., assignor to Phillips Petroleum Company, a corporation of Delaware Application October 23, 1950, Serial No. 191,676

7 Claims. (Cl. 260—96.5)

This invention relates to a process for the preparation of an adduct between an adduct-forming organic compound and an amide selected from the group consisting of urea and thiourea. In one of its aspects, this invention relates to a process for the separation of such an adduct-forming compound from admixture with a non-adduct-forming compound. In still another of its aspects, this invention relates to a process for purifying and decomposing an adduct formed by reacting an adduct-forming organic compound with urea or thiourea.

In the prior art, it is known that urea will react with certain straight carbon atom chain organic compounds to form a solid crystalline adduct. It is further known that thiourea will form a crystalline adduct with certain branched carbon atom chain organic compounds. In accordance with this knowledge, there have been provided processes for separating mixtures of straight chain compounds and branched chain compounds by utilizing urea or thiourea to selectively form an adduct with one of such classes of compounds. For example, urea can be admixed with a mixture of certain straight and branched chain hydrocarbons to cause it to form a solid adduct with the straight chain hydrocarbon while permitting the branched chain hydrocarbon to remain in a non-adducted state. The non-adduct-forming hydrocarbon can then be readily separated from the solid adduct of urea and straight-chain hydrocarbon to thereby afford a means for a ready separation of hydrocarbons into fractions according to their chain types or molecular configuration. The adduct can be decomposed by heating to yield the straight chain hydrocarbon and urea, however, in such a process, the adduct formed between the adduct-forming organic compound and the urea or thiourea contains occluded impurities such as the non-adduct-forming compound which will contaminate the adduct-forming organic compound product upon its liberation from the adduct form. Although the adduct containing such occluded impurities can be washed in an effort to free it from its occluded impurities, ordinary washing does not remove such impurities to the desired extent because the adduct has a tendency to adsorb the impurities to such an extent that they can be removed only with great difficulty if at all. Thus, it is apparent that a method for efficiently washing such an impurity-containing adduct is necessary to produce a high purity adduct-forming organic compound product. Further, it would be highly desirable to possess a process for not only efficiently washing an adduct free from occluded impurities but to also decompose the adduct immediately after it has been washed and before it can become contaminated with impurities before it is decomposed.

It has now been found that a solid crystalline adduct can be formed in an adduct-forming zone by reacting an amide selected from the group consisting of urea and thiourea with an adduct-forming organic compound in the presence of a non-adduct-forming organic compound, and after filtering as much as is possible of the non-adduct-forming compound from said adduct, the latter can be freed from occluded impurities such as the non-adduct-forming compound by passing a washing medium countercurrently to the adduct while the latter is being compressed by a suitable means such as by a porous piston. In this manner, the adduct is very intimately contacted with the washing medium since the compression thereof causes the washing medium to pass through the innermost pores of the adduct thereby effecting a substantially complete removal of occluded impurities from the adduct.

It has also been found that such an impurity-containing adduct can be washed and decomposed in a decomposition zone comprising three sub-zones, namely, a cooling, a filtering and a heating sub-zone. The adduct is consecutively passed through the three sub-zones in the order named in countercurrent relationship to a washing medium. The adduct as it enters the first or cooling sub-zone is compressed while being intimately contacted with the washing medium. The washing medium enters the heating sub-zone and is heated to a temperature sufficiently high to decompose the adduct. The heated washing medium then enters the filtering sub-zone wherein it causes the adduct to be decomposed to liberate the adduct-forming compound and the selected amide. Liberated adduct-forming compound is withdrawn from the filtering sub-zone and the liberated amide is passed into the heating sub-zone wherein any undecomposed adduct accompanying it is completely decomposed. Washing medium passes from the filtering sub-zone into the cooling sub-zone wherein it is cooled sufficiently to permit it to assume its washing function without decomposing the adduct in such sub-zone. Thus, in effect, the washing medium is employed as a decomposition or heat carrier medium in the heating and filtering sub-zones and as a washing medium in the cooling sub-zone. In this manner, the introduction of a plurality of extraneous streams of materials to perform the decomposition and washing functions is avoided.

It is an object of this invention to provide a process for preparing a pure adduct free from occluded impurities.

It is another object of this invention to provide a process for separating an adduct-forming organic compound from admixture with a non-adduct-forming compound by the selective formation of an adduct with urea or thiourea wherein the degree of separation between such compounds is very high.

It is still another object of this invention to provide a process for washing and decomposing an adduct of an adduct-forming organic compound and urea or thiourea wherein the washing and decomopsition of said adduct is accomplished efficiently with a single countercurrently flowing medium.

It is yet another object of this invention to provide a process for washing an adduct of the aforesaid type wherein occluded impurities are efficiently and substantially removed therefrom to produce a substantially pure adduct.

Other objects, advantages and features of this invention will become apparent to one skilled in the art upon reading the disclosure and claims in conjunction with the attached drawings wherein Figure 1 illustrates a preferred embodiment of the process of this invention and Figures 2 and 3 illustrate details of a compressing means adapted to be employed in the process of this invention.

Referring to Figure 1, the admixture of adduct-forming and non-adduct-forming organic compounds enters a reaction zone such as vessel 10 through lines 11 and 12. Crystalline amide, i. e. urea or thiourea, as the case may be, enters vessel 10 through conduit 13. The amide and admixture of organic compounds to be separated pass downwardly through vessel 10 wherein such conditions are maintained that the adduct-forming organic compound reacts with the amide to form a solid crystalline adduct while permitting the non-adduct-forming compound to remain in a non-adducted state. As the adduct-forming compound reacts with the amide to form an adduct, the crystals of amide become softer and fluffier as the reaction proceeds and tend to bridge across and compact in vessel 10. To prevent such bridging and compacting, there is provided a stirring mechanism comprising a rotatable shaft 14 having affixed thereto a plurality of arms 15. To further assist in preventing the newly formed adduct from agglomerating into large masses and to ensure better contact of the amide with unreacted adduct-forming compound, baffles 16, 17 and 18 are provided in the lower portion of vessel 10 as shown.

The adduct formed in vessel 10 passes therefrom in admixture with the non-adduct forming organic compound into a solids transporting device such as auger 19. The admixture of adduct and liquid non-adduct-forming compound is moved by auger 19 into an adduct filtration zone 22. Filtration zone 22 is formed by piercing the walls 20 of auger 19 to form a perforate or sieve-like section 23 through which liquid non-adduct-forming compound can drain into a collecting means such as jacket 24. The removed non-adduct forming compound is passed through line 25 to a separation zone to be described hereinafter. The solid crystalline adduct is moved by auger 19 through filtration zone 22 and, after the adduct has been separated from accompanying non-adduct forming compounds, is further moved into an adduct decomposition zone such as vessel 30. The decomposition zone is comprised of three sub-zones, namely, cooling sub-zone 27, filtering sub-zone 28 and heating sub-zone 29. According to this invention, vessel 30 is fitted at its upper end with a reciprocating porous piston 31.

Referring in particular to Figures 2 and 3, in conjunction with Figure 1, porous piston 31 is comprised of an annular cylindrical frame member 32 having a bearing member 33 disposed across one diameter thereof. Pivotally hinged to bearing member 33 are two semicircular valve sections 34 and 35 which are pivoted about bearing member 33 by means of hinges 36 and 37, respectively, in such a manner as to form a valved piston head. Semi-circular valve sections 34 and 35 can be comprised of frames 38 and 39, respectively, adapted to support a perforated member 40 and 41 which can be of screen, wire mesh, expanded metal or such, of sufficient fineness to prevent the passage of crystalline adduct therethrough but coarse enough to transmit liquid. Annular frame member 32 is provided with upper stops 42 and 43 against which frames 38 and 39 can rest when valve sections 34 and 35 are in a closed position. Porous piston 31 is mounted upon a piston rod 44 which enters the top of vessel 30 and can be packed therefrom by means of a packing gland, not shown. Lower stops 42A and 43A are attached to piston rod 44 as shown for the purpose of preventing valve sections 34 and 35 from pivoting too closely to piston rod 44. A power supply 45 can be supplied to reciprocate piston rod 44 and porous piston 31 in vessel 30, as shown.

In operation, the porous piston 31 is pushed downwardly by means of power supply 45 acting through piston rod 44 and, in so doing, compresses the adduct throughout vessel 30 and, in particular, in the upper portion thereof. The downward movement causes valve sections 34 and 35 to seat against upper stops 42 and 43, respectively, to thereby form a porous piston capable of compressing the adduct contained in vessel 30 while permitting liquid flow upwardly therethrough. After the porous piston has travelled the full length of its downward stroke, power supply 45 will withdraw it towards the upper end of the vessel 30. In so doing, the adduct deposited on the top of porous piston 31 by auger 19 while the piston is advanced in a position below the discharge of auger 19 into vessel 30, will cause valve sections 34 and 35 to pivot about bearing member 33 until they rest on lower stops 42A and 43A to thereby open piston 31 to downward solids flow as it is withdrawn upwardly. In such fashion, the piston 31 is withdrawn upwardly without compressing the adduct on the top by permitting such adduct to pass through the piston. After the upward stroke has been completed, the piston is again pushed downwardly and valve sections 34 and 35 are again pivoted until they rest against stops 42 and 43.

A washing and decomposing medium can be introduced into vessel 30 through lines 46 and 47 to be distributed therein through distributing means 48 which can comprise a perforated pipe, spider or any other suitable fluid distributing means. As the washing and decomposition medium flows upwardly through vessel 30 it enters heating sub-zone 29 in countercurrent contact with the descending adduct and any free amide. The heating and decomposition medium is heated in heating sub-zone 29 by contact with the walls thereof which are jacketed with a heating coil 49. Also, the heat supplied by coil 49 assists in the decomposition of any undecomposed adduct pushed downwardly through vessel 30 in order to liberate substantially all of the adducted amide and the adduct-forming compound. The hot washing and decomposition medium emerges from heating sub-zone 29 and enters the filtering sub-zone 28 wherein it contacts the cool compressed adduct passing downwardly from cooling sub-zone 27. As the hot decomposition medium contacts the downwardly descending adduct, the latter is decomposed to liberate the selected amide, i. e., urea or thiourea, as the case may be, and the adduct-forming compound. Part of the adduct-forming compound containing part of heating and washing medium is filtered from the liberated amide through perforated walls 60 of vessel 30 and is collected in jacket 61 to be removed through line 62 to a separation zone to be described hereinafter.

After the hot washing and decomposition medium has performed its function of decomposing the adduct in filtering sub-zone 28, the portion not passing through perforated walls 60 passes into cooling sub-zone 27 wherein it is cooled by contact with the cooled walls of vessel 30. The walls of vessel 30 are cooled by cooling coil 63. As the cool washing and decomposition medium passes through cooling sub-zone 27 and that portion of vessel 30 immediately thereabove, it is intimately contacted with the adduct contained therein by the compressing action of porous piston 31. Such compressing action forces the cooled washing and decomposition medium through the innermost pores of the adduct thereby removing occluded impurities from the adduct. The occluded impurities are dissolved in the washing and decomposition medium and are withdrawn from vessel 30 through line 65 and can be returned to the feed line 12 of vessel 10. In this manner, the occluded impurities, which are primarily the non-adduct-forming compound fed to vessel 10 through feed line 11, are returned to reaction vessel 10 to be passed therethrough and finally removed from the system by means of filtration zone 22 and line 25.

The material removed from filtration zone 22 through line 25 will, as stated, be the non-adduct-forming compound having admixed therewith a portion of the washing and decomposition medium which was returned to vessel 10 through line 65. This material is passed through a fractional distillation zone 66 wherein the non-adduct-forming compound is separated from the decomposition and washing medium, the non-adduct-forming compound being removed from fractional distillation zone 66 through line 67, while the washing and decomposition medium is removed through line 68.

The filtrate removed from filtering sub-zone 28 via line 62 is passed to a distillation zone 69 from which the heating and decomposition medium is removed through line 70 to be admixed with the washing and decomposition medium from line 68 and thence to pass through line 71 back to vessel 30. The adduct-forming compound can be removed to storage through line 72.

The liberated urea or thiourea, as the case may be, is removed from vessel 30 through conduit 73 having a solids rate-of-flow control device such as star valve 74 located therein. The urea or thiourea is then elevated by a solids lifting device, such as bucket elevator 75, to pass through conduit 13 back to reaction vessel 10.

Although the concept of this invention is applicable to a process for forming an adduct of any compound capable of forming an adduct with an amide selected from the group consisting of urea or thiourea and to a process for the separation of any compound capable of forming an adduct with urea or thiourea from admixture with a compound not capable of forming such adduct with urea or thiourea under the conditions employed in the adduct-forming zone, a general description of the types of compounds which do and do not form adducts will be given in order to better illustrate the applicability of the process of this invention.

In general, an adduct can be formed by contacting a straight carbon atom chain organic compound with urea in the presence of an activator-solvent, such as methanol, water, or the like. Alternatively, a branched carbon atom chain compound can be contacted with thiourea in the presence of such an activator-solvent to produce an adduct. The straight-chain compound can be admixed with a branched-chain organic compound, the latter of which, in general, do not form adducts with urea. The straight-chain compound can comprise one or more of a normal alkane or alkene hydrocarbon having from 6 to 50 carbon atoms in the molecule, such as hexane, the hexenes, heptane, the heptenes, octane, the octenes, nonane, the nonenes, decane, the decenes and progressively higher molecular alkanes and alkenes including those having 50 carbon atoms. The straight carbon atom chain compound can also be a primary alcohol having from 6 to 50 carbon atoms and being saturated or unsaturated and thus corresponds in carbon atom configuration to the straight-chain hydrocarbons above-mentioned. Urea will also form adducts with such straight carbon atom chain compounds as primary amines having from 6 to 50 carbon atoms per molecule, mercaptans having from 6 to 50 carbon atoms per molecule, ketones having from 3 to 50 carbon atoms per molecule, esters of organic acids having from 5 to 50 carbon atoms per molecule, and organic acids having from 4 to 50 carbon atoms per molecule.

Urea does not form adducts with branched carbon atom chain organic compounds nor with cyclic or aromatic organic compounds such as isohexane, methyloctane, cyclohexane, benzene, toluene and cymene. When employing urea in a process of this invention to separate an adduct-forming straight-chain compound from a non-adduct-forming branched-chain or cyclic compound, any one or more of the straight carbon atom organic compounds illustrated above can be admixed with one or more of the non-adduct-forming compounds.

Thiourea forms adducts with branched carbon atom chain organic compounds but does not form adducts with straight carbon atom chain organic compounds nor with aromatic compounds. Thus, adduct-forming power of thiourea is substantially opposite to that of urea in that thiourea forms adducts with branched-chain organic compounds and not with straight-chain organic compounds, while urea forms adducts with the straight-chain organic compounds but not with the branched-chain organic compounds. Thus, thiourea can form adducts with such compounds as the branched carbon atom chain alkane and alkene hydrocarbons having from 5 to 50 carbon atoms in the straight-chain portion of the molecule and from 1 to 20 carbon atoms in a side chain. Illustrative of such compounds are isohexane, ethylhexane, isohexene, isoheptane, isoheptene, ethylheptane, ethylcyclooctane, trimethylnonane, cyclohexane, cyclooctane, and methylcyclohexane. Thiourea also forms an adduct with a secondary or tertiary alcohol having from 5 to 50 carbon atoms in the straight-chain portion of the molecule and from 1 to 20 carbon atoms in the side chain; with a secondary and tertiary amine having at least 7 carbon atoms per molecule, with a mercaptan having from 5 to 50 carbon atoms in the straight chain portion of the molecule and from 1 to 20 carbon atoms in a side chain; and with a ketone having from 5 to 50 carbon atoms in the straight chain portion of the molecule and 1 to 20 carbon atoms in a side chain. Thiourea also forms an adduct with various cycloparaffins having at least 6 carbon atoms in the cyclic portion of the molecule and which can or cannot contain various side chains containing 1 or more carbon atoms per chain, such as cyclohexane, cycloheptane, cyclooctane, cyclononane, methylcyclohexane, and dimethylcyclooctane. Thiourea can be employed as the adduct-forming material to separate a mixture of one or more compounds which form adducts therewith from one or more compounds which do not form adducts with thiourea. Further, the process of this invention is applicable to the separation of an organic compound capable of forming an adduct under the particular conditions employed in an adduct-forming zone from an organic compound not capable of forming a solid adduct under those conditions even though the latter can form an adduct under conditions other than those obtaining in the adduct-forming zone. Thus, a longer chain normal paraffin such as decane will form an adduct with urea at a higher temperature than will a shorter chain normal paraffin such as heptane. Hence a mixture of longer chain and shorter chain hydrocarbons, e. g., decane and heptane, can be separated by employing an adduct-forming temperature above that of heptane but below that of decane.

The foregoing specific examples of compounds capable of forming an adduct with urea or thiourea is not exhaustive but is demonstrative of the types of compounds to which the process of this invention can be applied. Other compounds not specifically named aboved can be readily suggested by those skilled in the art upon reading the disclosure of the instant invention and an exhaustive listing of all organic compounds capable and not capable of forming an adduct with urea or thiourea would not aid in an understanding of the present invention. Further, the process of this invention can be applied to various organic compounds, particularly hydrocarbons, which form adducts with selenourea and tellurourea.

The urea or thiourea employed in the process of this invention is activated by a suitable activator. Among such activators are water; low boiling aliphatic alcohols, such as methanol and ethanol; the low boiling esters, such as methyl acetate; and ammonia or a substituted ammonia, such as ethylamine, methylamine, dimethylamine, ethanolamine, trimethylamine, or other heterocyclic nitrogen-containing compounds such as pyridine, pyrazole, picoline, and such. The amount of activator employed is preferably just sufficient to wet the surface of the amide particles although it can be within the range of 0.05 to 10, preferably from 0.1 to 7, weight per cent of the amide. The activator should be present with the amide as the latter enters into the adduct-forming reaction in vessel 10. Make-up activator can be added to the amide by injecting the same into line 13 by a suitable spray device (not shown).

The conditions employed in reaction vessel 10 in order to perform the desired adduct-forming functions will depend somewhat upon the nature of the feed material, the desired degree of separation between the adduct-forming and non-adduct-forming compounds and upon numerous other factors. In general, the temperature in adduct-forming zone 10, to induce the formation of an adduct, should be within the range of minus 70 to 120° F., preferably from 0 to 100° F. Obviously, when the temperature is below the freezing point of water, another activator should be employed such as methanol or ethanol.

The pressure employed in vessel 10 should be sufficient to maintain the feed material in a liquid phase and accordingly will vary with the nature of the feed. Ordinarily, it is preferred to operate at substantially atmospheric pressure when the feed material has a boiling point which will permit operation in a liquid phase at such pressure. Higher pressures as high as 10 to 500 pounds per square inch can be employed, if desired, or when the boiling point of the feed so demands.

The amount of urea or thiourea employed in vessel 10 will depend upon the nature of the adduct to be formed and upon the concentration of the adduct-forming compound in the feed. Ordinarily the amount of urea and thiourea employed should be within the range of 1 to 20 mols per mol of adduct-forming compound in the feed. The residence time of the urea or thiourea in vessel 10 should be sufficient to insure substantially complete removal of the adduct-forming compound from the feed material. A residence time within the range of 5 minutes to 2 hours, preferably from 10 to 30 minutes, will be satisfactory. The amount of washing and decomposition medium introduced through line 47 into decomposition zone 30 should be sufficient to perform the dual function of decomposing and washing the adduct formed therein, as will be obvious from the foregoing description of the process. A portion of such washing and decomposition medium will be removed with the adduct-forming compound from vessel 30 through line 62. Another portion will continue upwardly through vessel 30 to serve as a washing medium in cooling sub-zone 27 and will be removed therefrom through line 65 in admixture with the occluded impurities removed from the adduct. Accordingly, the exact amount of washing and decomposition medium employed will depend upon the amounts desirably withdrawn through lines 62 and 65 in admixture with the liberated adduct-forming compound and the occluded impurities, respectively. As a feature of this invention, sufficient washing and decomposition medium can be employed to permit the withdrawal of an amount thereof from vessel 30 through line 65 sufficient, when introduced in reaction vessel 10, to dilute the feed material passing through line 11. Thus, when the feed material is a viscous or solid material, such as the high boiling hydrocarbons in the above-described range of carbon atom content, the washing and decomposition medium can be employed as a diluent or solvent to render such material sufficiently fluid to intimately contact the urea or thiourea and to render the non-adduct-forming compounds sufficiently fluid to be withdrawn through filtration zone 22. Also, when the concentration of adduct-forming compound in the feed is excessive, that is, so high that substantially all of the feed forms a solid crystalline adduct thereby making the removal of non-adduct-forming compound in filtration zone 22 difficult, sufficient washing and decomposition medium can be employed to act as a solvent for such non-adduct-forming compounds in order to effect a more ready removal thereof through filtration zone 22. Obviously, the exact amount of washing and decomposition medium to be employed either as a diluent or solvent for viscous or solid feed materials or as a solvent for low concentrations of non-adduct-forming compound in the feed will depend upon several factors such as the nature of the feed, the solvent power of the selected washing and decomposition medium and others. However, the exact amount to be employed in any given instance can be readily determined by mere routine test within the skill of the art.

Ordinarily, there can be employed as the amount of washing and decomposition medium introduced through line 47 to vessel 30, an amount within the range of 1 to 50, preferably 3 to 10, gallons of washing and decomposition medium per cubic foot of solid crystalline material passing out the lower end of vessel 30. It will be noted that a portion of the washing and decomposition medium must be unavoidably withdrawn from decomposition zone 30 and filtering sub-zone 28 through line 62, the remaining portion passing upwardly through cooling sub-zone 27. In passing through sub-zone 27, it will carry with it some of the liberated adduct-forming compounds which will contact the cool adduct in cooling sub-zone 27. Such adduct will ordinarily contain a portion of unreacted amide, part of which may react with the adduct-forming compound contained in the washing and decomposition medium to form an adduct which will again be carried downwardly through vessel 30 from cooling sub-zone 27 to filtering sub-zone 28. Any adduct-forming compound which is not adducted in cooling sub-zone 27 will be carried upwardly therethrough by the washing and decomposition medium and will be returned to vessel 10 via lines 65 and 12.

The rate of withdrawal of non-adduct-forming compound and admixed washing and decomposition medium through line 25 from filtration zone 22 should be such that there is no net liquid flow through auger 19 between filtration zone 22 and vessel 30. When so adjusted, none of the washing and decomposition medium passing upwardly through vessel 30 will be withdrawn through auger 19, filtration zone 22 and line 25, thereby avoiding contaminating the non-adduct-forming compound product recovered in fractional distillation zone 66 with any adduct-forming compound which may be contained in the washing and decomposition medium in the upper portion of vessel 30.

The washing and decomposition medium should be selected from that class of compounds which are liquids and non-adduct-formers under the conditions existing in vessels 10 and 30 and which have a solvent power for the occluded impurities of the adduct and yet which have not a solvent power for the adduct or for urea or thiourea. Among such compounds are the lower molecular weight aliphatic hydrocarbons, such as those having from 3 to 5 carbon atoms per molecule, the cycloparaffin hydrocarbons having from 3 to 5 carbon atoms per molecule and such. Representative of such compounds are propane, butane, isobutane, pentane, isopentane, cyclopropane, cyclobutane, cyclopentane, methylcyclopentane, and such. Other hydrocarbons or the like can be employed when they do not form an adduct with urea or thiourea under the actual conditions employed in the process and when they are not a solvent for the urea or thiourea.

The conditions employed in vessel 30 to decompose the adduct passing downwardly therethrough will depend upon the decomposition temperature at which the particular adduct is decomposed and upon numerous other factors, such as the residence time of the adduct in the heated portion of vessel 30 and the desired degree of decomposition of said adduct contained therein. Ordinarily, sufficient heat should be supplied to heating sub-zone 29 to insure that the washing and decomposition medium will emerge therefrom at a temperature within the range of 125 to 200° F., preferably from 130 to 180° F. In so doing, the washing and decomposition medium will be heated to a temperature sufficiently high to insure substantially complete decomposition of the adduct which it contacts in filtration sub-zone 28. Further, the heat supplied by heating sub-zone 29 will insure that any adduct not decomposed in filtration sub-zone 28 will be decomposed in heating sub-zone 29 before passing therefrom. Obviously, any liberated adduct-forming compound liberated in heating sub-zone 29 will be carried upwardly therethrough along with the washing and decomposition medium. The temperature in cooling sub-zone 27 should be within the range of those employed in vessel 10.

If desired, higher decomposition temperatures can be employed than those set forth in the specified ranges above, provided that the maximum temperature employed in vessel 30 does not exceed the melting point of urea (271° F.) or the melting point of thiourea (356° F.). The pressures employed in decomposition zone 30 and vessel 10 should be such that any liquid flow in auger 19 from vessel 30 to vessel 10 or vice versa is prevented.

Although a pivoted porous piston has been described and is preferable in the practice of this invention in order that auger 19 can run continuously, the porous piston 31 can be replaced with a porous piston which is not pivoted but has the porous section fixed in position. In so doing, auger 19 will be run intermittently, that is, auger 19 will discharge solid adduct into vessel 30 only when the non-pivoted porous piston is withdrawn in the upper portion thereof in order to prevent deposition of the solid adduct on the top of the non-pivoted porous piston thereby stopping its reciprocating action.

The above described method for practicing the process of this invention can be modified to permit countercurrent flow of the crystalline amide and the admixture of adduct-forming and non-adduct-forming organic compounds. To do so, auger 19 can be inclined upwardly with respect to vessel 10 so that the adduct discharge end of auger 19 is at a level above the upper end of vessel 10. The feed admixture of adduct-forming and non-adduct-forming compounds is fed into vessel 10 at a point near its bottom and the non-adduct-forming compound is withdrawn at the top thereof. The non-adduct-forming compound will maintain a liquid level in the inclined auger of the same height as that in vessel 10. The elevation of the adduct from its discharge point at the bottom of vessel 10 by means of the inclined auger will lift it above the level of non-adduct-forming compound existing in the auger thereby eliminating the necessity for filtering zone 22 as shown in Figure 1.

The rate at which piston 31 reciprocates will depend upon the rate at which the adduct-forming compound is supplied to vessel 30 and upon numerous other factors such as the desired degree of compression of the adduct in the upper portion of decomposition zone 30, the desired degree of washing of the adduct and upon the fluffiness or compressibility of such adduct. Ordinarily, a rate of reciprocation within the range of about 10 to about 300, preferably from about 50 to about 150, cycles per hour is satisfactory.

While the invention has been described in connection with a present, preferred embodiment thereof, it is to be understood that this description is illustrative only and is not intended to limit the invention, the scope of which is defined by the appended claims.

I claim:

1. A process for washing and decomposing a crystalline adduct formed by reacting an adduct-forming organic compound with an amide selected from the group consisting of urea and thiourea wherein said adduct contains an occluded impurity which comprises maintaining a column of said amide and an adduct of said adduct-forming organic compound with said amide as a compact mass of crystals, feeding said adduct to one end of said column, withdrawing washed amide from the other end of said column, feeding a liquid washing and decomposition medium to said other end of the column whereby the adduct crystals are countercurrently washed by said medium as they travel through the column from said one end to said other end, supplying heat to the material adjacent said other end of the column to define an adduct-decomposition zone, withdrawing said adduct-forming compound together with a portion of said liquid medium at a filtering zone near the center of said column, withdrawing heat from said column adjacent said one end thereof so as to cool the adduct without decomposing it, pressing a member impervious to solid crystalline material but porous to said liquid medium against said one end of the column longitudinally thereof in the proper direction to compress and compact the column of crystalline material whereby an efficient washing action is obtained by contact of the said medium and crystals in the cooling zone and the rest of said liquid medium passes through said member, and withdrawing the rest of said liquid medium after it has passed through said member.

2. A process for washing and decomposing a crystalline adduct formed by reacting an adduct-forming organic compound with an amide selected from the group consisting of urea and thiourea wherein said adduct contains an occluded impurity which comprises maintaining a column of said amide and an adduct of said adduct-forming organic compound with said amide as a compact mass of crystals, feeding said adduct to one end of said column, withdrawing washed amide from the other end of said column, feeding a liquid washing and decomposition medium to said other end of the column whereby the adduct crystals are countercurrently washed by said medium as they travel through the column from said one end to said other end, supplying heat to the material adjacent said other end of the column to define an adduct-decomposition zone, withdrawing said adduct-forming compound together with a portion of said liquid medium at a filtering zone near the center of said column, withdrawing heat from said column adjacent said one end thereof so as to cool the adduct without decomposing it, cyclically and recurrently pressing a member impervious to solid crystalline material but porous to said liquid medium against one end of the column while maintaining fixed the other end of the column whereby the crystalline materials making up the column are compressed and compacted, thereby promoting the contact of the washing and decomposition medium with the crystalline material making up the column whereby the rest of said liquid medium passes through said member, and withdrawing the rest of said liquid medium after it has passed through said member.

3. A process for washing an occluded impurity from a crystalline adduct formed by reacting an adduct-forming organic compound with an amide selected from the group consisting of urea and thiourea which comprises maintaining a column of said impure adduct, feeding impure adduct into said column at one end thereof, feeding a washing medium comprising a low boiling non-adduct-forming hydrocarbon to the other end of said column, whereby the washing medium and adduct pass countercurrently through the column, cyclically and recurrently pressing a member impervious to solid crystalline material but porous to said liquid medium against one end of the column so as to compress and compact the material thereof and force said one end of the column toward the other end thereof, whereby intimate contact of said washing medium and said impure adduct is promoted, and withdrawing a portion of said washing medium through said member.

4. A process for washing and decomposing a crystalline adduct formed by reacting an adduct-forming organic compound with an amide selected from the group consisting of urea and thiourea wherein said adduct contains an occluded impurity which comprises maintaining a column of said amide and an adduct of said adduct-forming organic compound with said amide as a compact mass of crystals, feeding said adduct to one end of said column, withdrawing washed amide from the other end of said column, feeding a liquid washing and decomposition medium to said other end of the column at a rate within the range of 1 to 50 gallons per cubic foot of crystalline material passing through the column whereby the adduct crystals are countercurrently washed by said medium as they travel through the column from said one end to said other end, supplying heat to the material adjacent said other end of the column to heat it to a temperature within the range of 125 to 200° F. thereby defining an adduct-decomposition zone, withdrawing said adduct-forming compound together with a portion of said liquid medium at a filtering zone near the center of said column, withdrawing heat from said column adjacent said one end thereof so as to cool the adduct to a temperature within the range of —70 to +120° F. without decomposing it, pressing a member impervious to solid crystalline material but porous to said liquid medium against one end of the column longitudinally thereof in the proper direction to compress and compact the column of crystalline material whereby an efficient washing action is obtained by contact of the said medium and crystals in the cooling zone and the rest of said liquid medium passes through said member, and withdrawing the rest of said liquid medium after it has passed through said member.

5. Apparatus for treating crystalline materials which comprises, in combination, an elongated vessel, feeding means connected to said vessel adjacent one end thereof to introduce crystalline material into said vessel, a crystal withdrawal conduit connected to and communicating with said vessel adjacent the other end thereof, a filter located at an intermediate region of said vessel including a member communicating with the interior of said vessel, said member being pervious to liquids but impervious to crystalline material, means for withdrawing filtrate from said filter, a cooling device located between said filter and said feeding means in thermal contact with said vessel, means for circulating a cooling medium through said device, a heating device located between said filter and said outlet conduit, said heating device being in thermal contact with said vessel, means for circulating a heating medium through said heating device, a piston located within said vessel at said one end thereof and arranged to move longitudinally within said vessel, said piston being formed from a material which is pervious to liquids but impervious to crystalline material, and means for reciprocating said piston.

6. Apparatus for treating crystalline materials which comprises, in combination, an elongated vessel, feeding means connected to said vessel adjacent one end thereof to introduce crystalline material into said vessel, a crystal withdrawal conduit connected to and communicating with said vessel adjacent the other end thereof, a filter located at an intermediate region of said vessel including a member communicating with the interior of said vessel, said member being pervious to liquids but impervious to crystalline material, means for withdrawing filtrate from said filter, a cooling device located between said filter and said feeding means in thermal contact with said vessel, means for circulating a cooling medium through said device, a heating device located between said filter and said outlet conduit, said heating device being in thermal contact with said vessel, means for circulating a heating medium through said heating device, a liquid distributor assembly located within said vessel at a region intermediate said heating device and said conduit, means for feeding a washing medium to said distributor, and a piston located within said vessel at said one end thereof and arranged to move longitudinally within said vessel, said piston being formed from a material which is pervious to liquids but impervious to crystalline material, and means for reciprocating said piston.

7. Apparatus for treating crystalline materials which comprises, in combination, an elongated vessel, a screw conveyor connected to said vessel adjacent one end thereof to introduce crystalline material into said vessel, a crystal withdrawal conduit connected to and communicating with said vessel adjacent the other end thereof, a filter located at an intermediate region of said vessel including a member communicating with the interior of said vessel, said member being pervious to liquids but impervious to crystalline material, means for withdrawing filtrate from said filter, a cooling device located between said filter and said feeding means in thermal contact with said vessel, means for circulating a cooling medium through said device, a heating device located between said filter and said outlet conduit, said heating device being in thermal contact with said vessel, means for circulating a heating medium through said heating device, a liquid distributor assembly located within said vessel at a region intermediate said heating device and said conduit, means for feeding a washing medium to said distributor, a star valve in said conduit, a crystal transporting device having one end thereof connected to said conduit, a vessel, a line connecting the outlet of said transporting device to said vessel, means for discharging material from said vessel into said screw conveyor, and a piston located within said vessel at said one end thereof and arranged to move longitudinally within said vessel, said piston being formed from a material which is pervious to liquids but impervious to crystalline material, and means for reciprocating said piston.

References Cited in the file of this patent

UNITED STATES PATENTS

| 2,011,186 | Van Dijck | Aug. 13, 1935 |
| 2,150,608 | Olier | Mar. 14, 1939 |
| 2,183,837 | Hamilton et al. | Dec. 19, 1939 |
| 2,499,820 | Fetterly | Mar. 7, 1950 |
| 2,577,202 | Lien et al. | Dec. 4, 1951 |
| 2,603,667 | Pankratz et al. | July 15, 1952 |
| 2,606,140 | Arnold et al. | Aug. 2, 1952 |
| 2,615,794 | Shelby | Oct. 28, 1952 |
| 2,617,274 | Schmidt | Nov. 11, 1952 |

OTHER REFERENCES

Ser. No. 255,849, Suss (A. P. C.), published June 1, 1943.